United States Patent [19]
Avondoglio

[11] Patent Number: 5,342,433
[45] Date of Patent: Aug. 30, 1994

[54] DUST COLLECTOR WITH BIMODAL SHAKER

[75] Inventor: Leo Avondoglio, Ivoryton, Conn.

[73] Assignee: Aercology, Inc., Old Saybrook, Conn.

[21] Appl. No.: 58,268

[22] Filed: May 10, 1993

[51] Int. Cl.⁵ .............................................. B01D 46/04
[52] U.S. Cl. ............................................ 95/282; 55/304
[58] Field of Search .............. 55/304, 305, 300, 341.6; 95/282

[56] References Cited

U.S. PATENT DOCUMENTS

| | | | |
|---|---|---|---|
| 1,912,280 | 5/1933 | Kleissler | 55/304 |
| 2,830,676 | 4/1958 | Schneider | 55/304 |
| 3,160,908 | 12/1964 | Peabody et al. | 55/300 |
| 3,475,884 | 11/1969 | Kulzer | 55/341.6 |
| 3,636,680 | 1/1972 | Seidel | 55/304 |
| 3,710,552 | 1/1973 | Genton | 55/300 |
| 4,199,334 | 4/1980 | Berkhoel | 55/304 |
| 4,204,846 | 5/1980 | Brenholt | 55/304 |
| 4,370,153 | 1/1983 | Russell et al. | 55/304 |
| 4,443,235 | 4/1984 | Brenholt et al. | 55/304 |
| 4,792,344 | 12/1988 | Belcher et al. | 55/304 |
| 5,087,274 | 2/1992 | Poor et al. | 55/304 |

OTHER PUBLICATIONS

Brochure, "New Tennant 85 Power Sweeper", 1964.
Torit Division, Donaldson Co. Inc. "Motor Operated Shakers" Jul. 30, 1974, 1 page.
Donaldson Co. "Automatic Shaker" (1990) pp. 20–21.
Torit Division, Donaldson Co. Inc. Linear.
Torit Div. Donaldson Co. Inc. "Linear Actuator" Oct. 18, 1974 1 page.
Aercology Inc. "DA Dust Collector" Dec. 1980 3 page.
Aercology Inc. "DM500/1000/1500 Product Profile" Jul. 1991 4 page.

*Primary Examiner*—Robert J. Warden
*Assistant Examiner*—T. A. Trembley
*Attorney, Agent, or Firm*—C. G. Nessler

[57] ABSTRACT

The vertically suspended filter bags of a dust collector are periodically shaken in a bi-modal manner, to removed adhered dust. Repetitious motions applied to the closed bag bottoms are comprised of a long lifting stroke, to partially fold the bags, followed by one or more short strokes of higher impulse, to simulate a rapping or hammering. Apparatus which effects the process includes a motor driven cam that lifts, and then drops, a shaker bar mounted transversely to the bag bottoms, and a device for stopping the cam in a position which leaves the bags hanging freely for further collection of particulate.

16 Claims, 4 Drawing Sheets

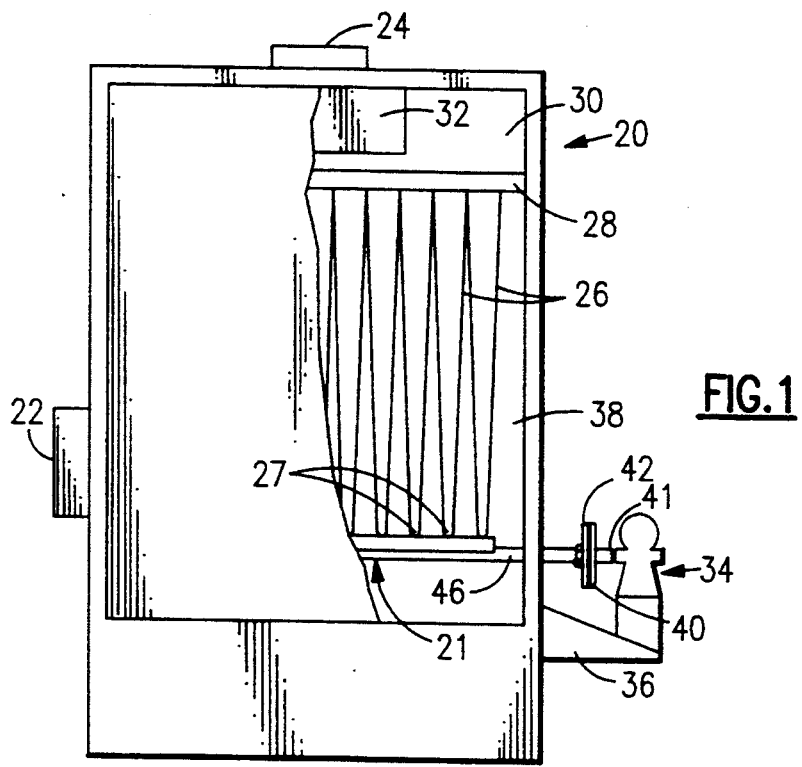
FIG. 1
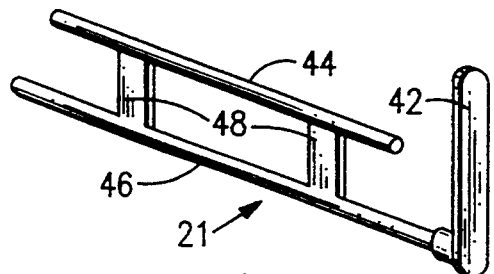
FIG. 3
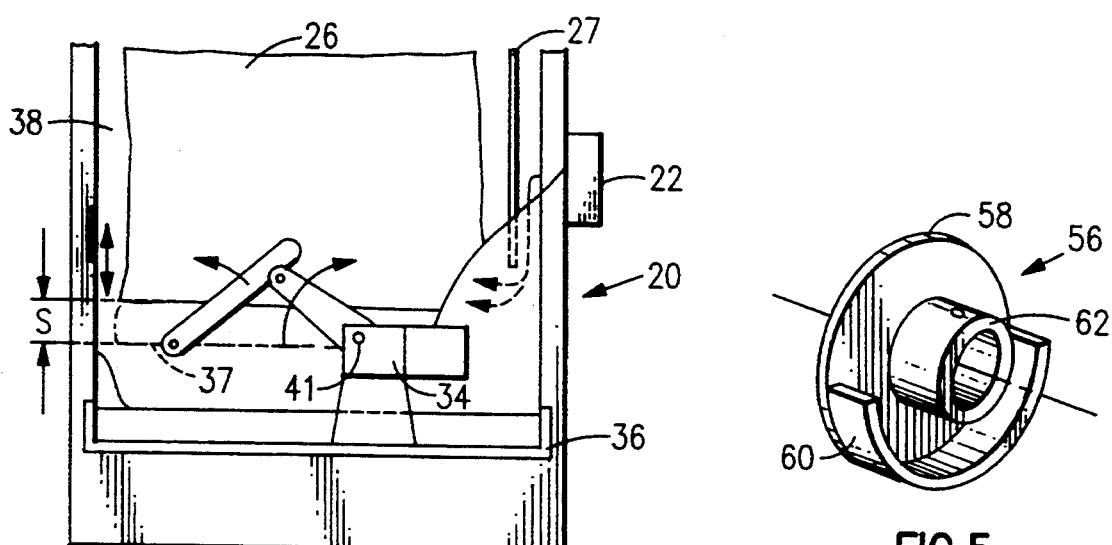
FIG. 2
FIG. 5

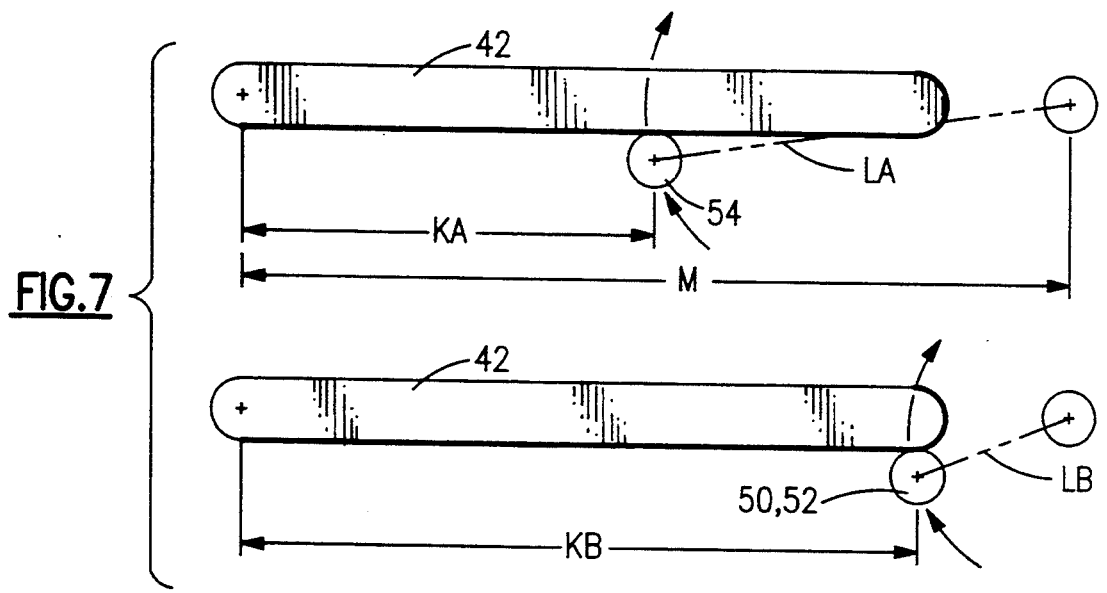
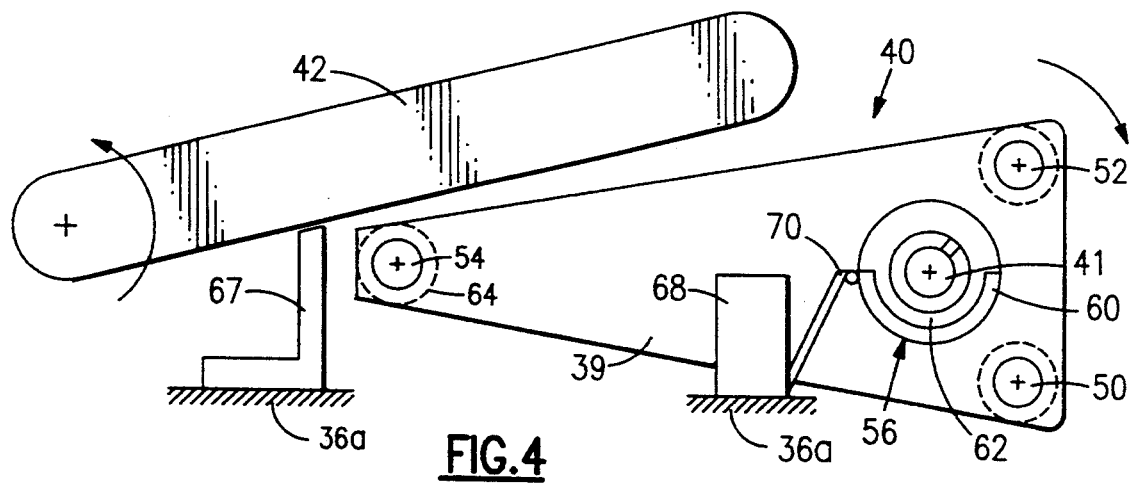
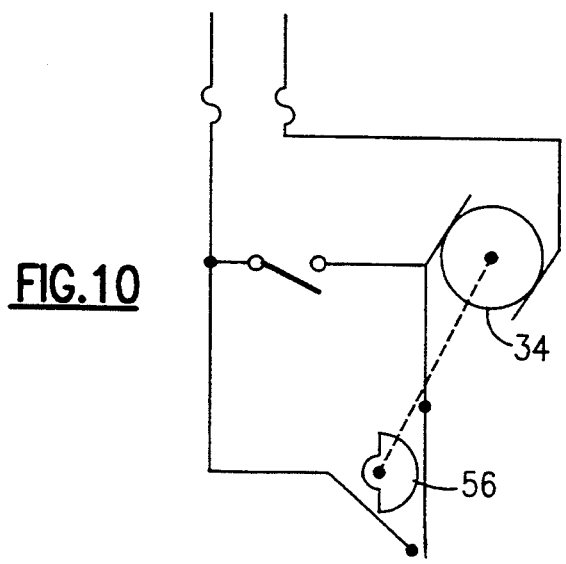

DUST COLLECTOR WITH BIMODAL SHAKER

FIELD OF INVENTION

The present invention relates to dust collectors, more particularly, to the removal of adhered dust from filter bags of dust collectors.

BACKGROUND

A common type of dust collector for capturing dusts at point sources in manufacturing facilities is comprised of fabric bags mounted in a container or cabinet. The bags are suspended from a mounting plate with their open ends facing upwardly and their closed ends hanging freely downwardly. A blower draws particulate laden gas into the region around the lower ends of the bags, thence through their porous walls, and upwardly out of the top end to a plenum and discharge point.

Fine particulates become trapped on and become stuck to the exterior of the bags and have to be periodically removed to maintain air flow through the collector. Commonly, the lower ends of filter bags are shaken; the dust falls to the bottom of the cabinet from which it is by and by removed. In smaller dust collectors, shaking is carried out by manually moving a lever which in one way or another shakes the bags. However, if shaking to remove dust is not done sufficiently often, or with sufficient vigor, the bags remain laden with dust, and their flow capacity, and thus the effectiveness of the whole system, will be less than it ought to be.

Thus for convenience or automation, powered mechanisms may be employed to carry out the shaking of the bags. Often, automated shaking seeks to simulate manual motion, i.e., a motor simply simulates the action of a person. For instance, a linear motor has been applied to the manual shaking lever.

A problem with any particular shaking mode is that it may not be sufficiently effective in removing all particulate, and thus re-optimizing flow. For instance, only a portion of the bag may be effectively cleaned. Another problem is that the automated shaking mechanism may be unduly complex and thus unreliable or costly. Thus, there is a need for simple and effective automated dust removal method and apparatus, and for one that can be readily applied to collectors in substitution of a manual shaker.

SUMMARY

An object of the invention is to effectively remove particulate from filter bags of dust collectors in an automated manner. Another object of the invention is to remove particulate from more than just a portion of each bag proximate the shaking mechanism. Another object is to have a simple mechanism which is adaptable to manual shaken collectors.

In accordance with the invention, the closed lower ends of filter bags are raised and dropped in a bimodal way. The lower end is raised a first distance and dropped, and then raised a second distance less than the first distance and dropped. The motions are repeated the desired number of times to remove the adhered particulate. The different lifting distances effect different degrees of removals of particulate. Preferably, each long distance raising is followed by two short distance raises; the second distance is less than half the first distance; and the impulse of the force which causes the short distance raising is substantially greater than the impulse of the force which causes the long distance raising.

The longer strokes may be characterized to be like folding motions while the shorter strokes may be characterized as being like rapping motions. In preferred practice in accord with the invention the average velocity of bag lifting for the first distance is less than the average velocity of lifting for the second distance.

Apparatus in accord with the invention has automatic means for carrying out the foregoing steps. In a preferred embodiment, a rotatable shaker bars runs perpendicularly to the length of bag lower ends which contain stiffeners; a vertically moving portion of the bar strikes the bag ends. The shaker has an arm which is driven by a motorized three-pin cam. One pin is distant from the cam center of rotation while the other two are closer. The one pin effects a first long stroke; and, then the other two closer pins effect two second shorter strokes during which the shaker bar contacts the bag ends to impart higher impulse and higher velocity. An arrangement of motor, pins, and arm effects the foregoing motions, while the dropping is preferably effected by force of gravity. When the bags are cleaned, a sub-cam and control system stop the motor and cam in a position such that the bags hang freely at their natural lengths.

By periodic use, the invention is effective in removing particulate of differing character from the sides of the bags, more so than a single mode of shaking. At the same time, the mechanisms of the preferred embodiment are relatively simple and of low cost, making them reliable and practical in industry.

BRIEF DESCRIPTION OF THE DRAWINGS

FIG. 1 shows a dust collector cabinet in elevation view, with cutaway to show the filter bags.

FIG. 2 is a right side view of the cabinet in FIG. 1, showing the gear motor, cam and arm of the shaker bar.

FIG. 3 shows a shaker bar from the bottom of the cabinet.

FIG. 4 is a detail view of the relation of cam and arm.

FIG. 5 shows the sub-cam.

FIG. 7 details the geometry of the cam-arm interaction.

FIG. 10 is a wiring diagram for the motor and sub-cam.

DESCRIPTION

Figure 6B:
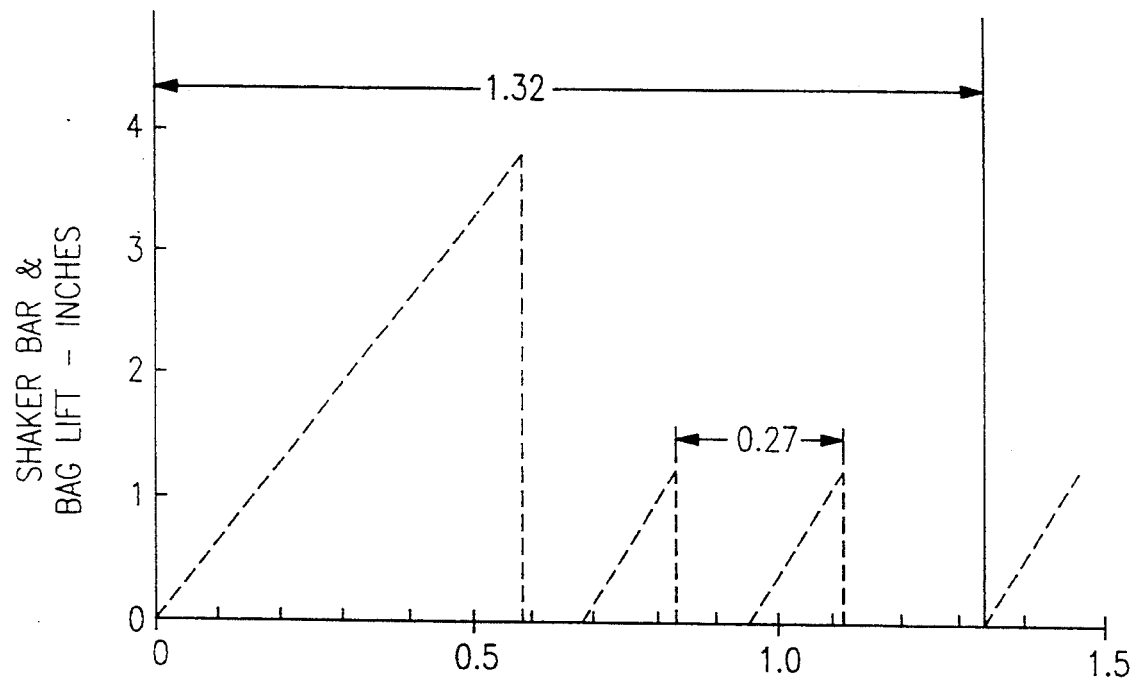
FIGS. 6A and 6B graphically show the rotary motion of the arm/shaker bar and the corresponding vertical lift of the bag ends, both as functions of time.

The invention is described in terms of a stationary dust collector of the type described in the background herein, such as one suited for air flows of around 500–1500 cubic feet per minute. Such collectors would typically be used to collect particulates created during metal grinding, woodworking, autobody sanding, etc.

FIG. 1 shows in end elevation a dust collector cabinet 20 with the interior partially exposed. A multiplicity of filter bags 26 are suspended through openings in a support plate 28, so that they hang freely to their natural vertical length within the inlet chamber 38 of the cabinet. The filter bags are made from commercially available felt or woven natural or synthetic materials, such as 9.7 ounce cotton sateen or 5 ounce polyester twill 3×1. A typical bag is oblong in cross section; it has about 17 inch oblong length, about one inch width (opening), and about 30 inch vertical length. The filter bags have typical known designs. The open upper ends are formed around metal stiffeners and they have internal metal mesh structure to keep them from collapsing under force of external air flow. The closed bottom ends 27 of the bags have about one-quarter pound of metal strips captured within their stitching. These add gravitational mass and impart rigidity to the bag bottom, aiding the shaking as described below. It will be understood that the invention is applicable to other bag shapes as well.

As shown in FIG. 2, air flows into the cabinet from inlet port 22, downwardly along baffle 27, and generally throughout the inlet chamber 38; then, through the bags, to the blower chamber 30 above the support plate 28. A blower 32 or like device induces the flow of air through the cabinet, drawing it into the chamber 30 and blowing it from exit port 24. Particulate is captured on the angled vertical sides of the bags. When the bags are shaken, preferably when the air flow is ceased, the dust falls downwardly to the bottom of the cabinet, from which it is periodically removed through access ports.

To loosen the adhered particulate, the filter bags are contacted by a shaker bar 21, shown in FIG. 3. The shaker bar 21 is an assembly comprised of a main pivot rod 46 and a striker bar 44, spaced apart, e.g., about 5.5 inch, from the pivot rod 46 by welded struts 48, and an arm 42. It runs transverse to the length of the oblong bottoms of the filter bags. The arm 42 is pin-connected at the end of the rod 46, where the rod projects outside the cabinet as shown in FIG. 1. The pivot rod 46 mounts in unshown bearings attached to the cabinet walls, enabling rotation during use.

FIG. 2 shows in right side view part of the cabinet 20 of FIG. 1, and with the other Figures illustrates how the shaker bar works. When the arm 42 is rotated counter-clockwise as shown by its arrow, the striker 44 moves vertically and contacts the lower ends 27 of the filter bags at their nominal mid-widths, lifting them a distance S vertically, from their free-length rest position 37 shown in phantom. The metal strips incorporated into the bag bottoms distribute the force of the striker, to cause the whole bottom ends of the bags to be raised. The striker rotary motion also has a horizontal component. Thus, the point of striker contact moves somewhat transversely, along the oblong bag length, imparting a desirable rocking motion of the bag bottom. In its rest postion, the striker is just at the point of contacting the free-hanging bag bottoms. Such is accomplished by adjusting a stop 67 which limits downward travel of the arm. See FIG. 4.

FIGS. 2 and 4 show more particularly how the shaker bar is actuated and moves. A fractional horsepower gear motor 34 has a cam assembly 40 attached to its driven shaft 41. It contacts and effects motion of the actuator arm 42. The motor 34 is mounted on a bracket 36 attached to the cabinet. The output shaft 41 and attached cam 40 rotate as shown by the counterclockwise arrow in FIG. 2.

FIG. 4 details with arrows, etc., how the cam assembly 40 actuates the actuator arm 42. The cam assembly 40 is comprised of three journal bearing roller pins 50,52 and 54 mounted on a plate 39. The pins 50,52 are located at a first radial length from the cam pivot point (i.e, its center of rotation, on the shaft 41 of the motor) compared to the greater second radial length to the pin 54. In FIG. 4 the outermost rotating roller part 64 of pin 54 is shown in contact with the arm 42. As the motor drives the cam 40 clockwise the arm 42 will be rotated counterclockwise, and thus the bag bottoms are lifted by rotation of the shaker bar. Continued motion of the cam 40 will raise the arm and bags to a point where the pin 54 loses contact with the arm 42. At this point shaker bar and arm 42 fall back by gravity to its rest position—determined by stop 67 which mounts off a part 36a of the bracket, and the bags reassume their free length. As the cam 40 continues to rotate, the pin 50 contacts the arm 42, causing it to again rise and fall; this is followed by pin 52; after which the pin 54 again contacts the arm to repeat the cycle. It will be appreciated from simple mechanics and geometry that the amount of rotation and thus the amount of lifting S of the the filter bags will be less when pins 50,52 contact the arm, than when pin 54 does.

In practice, the motor is actuated by an external command signal, from such as a timer or push button, at intervals and for periods of time which experience shows is sufficient to clean the bags and sustain efficient operation. The duration of motor-shaking will vary with the application; a typical installation might use 1-2 minutes of shaking every 4 hours.

When the command signal to the motor is ceased, the motor could disadvantageously stop in a position such that a cam pin has the arm 42 and bags in partially raised position. Thus, a control system is employed to stop the cam at a position where such will not be the case. FIG. 4 shows an electrical switch 68 having an actuator arm 70 which is engageable by a sub-cam 56. The welded sub-cam assembly is shown in more detail in FIG. 5. It is comprised of a plate 58, semi-circular piece 60 and a mounting collar 62. The collar has a set-screw to enable the sub-cam to be rotatably adjusted around the output shaft 41 of the gear motor, relative to the cam 40. When the sub-cam actuates the switch, the motor keeps running, notwithstanding the command signal may have ceased. When the shaft 41 and attached sub-cam rotate to the point of the switch arm 70 is no longer actuated, the motor stops. The wiring diagram in FIG. 10 shows how this is accomplished. For simplicity and to account for coasting of the motor after power is ceased, the sub-cam is a nominal semi-circle rather than being segmented to correspond with each cam roller.

The cam actuating mechanism desirably imparts to the bags different forces and motions during the shaking cycle, embodying the bi-modal shaking of the bag. In the first mode, there is a relatively long lifting stroke applied to the bag, to fold it along its length, and to loosen caked material. In the second mode, there is a shorter stroke, more sharply applied (and preferably repeated twice), which is somewhat simulative of a hammering or rapping motion. This loosens material not loosened by the folding motion.

Table 1 shows in more detail the effects of the rotation of the motor shaft for a preferred embodiment. Column A shows incremental angles of rotation of the cam, starting from an arbitrary starting point where the shaker bar just contacts the bottom of the bags, and ending with 360 degrees of rotation. Column B shows the associated angle of rotation of the arm 42. The vertical component of the shaker bar motion, i.e., the lift S of the bag bottoms, is shown in Column C. There is one long stroke of 3.8 inch and two short strokes of about 1.3 inch during each cycle of rotation of the motor. For a typical 27 inch long bag, the 3.8 inch long stroke is about 14% of the bag length while the shorter stroke is just under 5% of the bag length. The long stroke substantially causes the side walls of the bag to fold, compared to the short stroke. Within the meaning of this description, substantial folding of a bag comprises lifting it more than 10% of its free length and insubstantial folding occurs when the lift is less than 5%.

Column D shows the approximate revolutions per second of the motor at each step in the cycle with a motor as described below. The times will vary according to the characteristic of the motor driving the cam 40. Preferably, a Model 27800B Right-Angle AC/DC Gearmotor (Dayton Electric Mfg. Co., Chicago, Ill.). The Model 27800B unit has a 1/10 hp, 66 rpm (no load), 100 inch-lb motor, universal AC/DC motor, a type which substantially slows down under load, e.g., to about 20 rpm under full load for the Model 27800B. Thus, when applied to the dust collector described here, the speed of the motor varies according to the part of the cycle, the weight of the bags, the particular dimesion of the shaker bar 21, friction at bearings, etc.

arm pivot and cam pivot point is fixed at 11 inch. The weight of bags is assumed constant, with 75 inch-lb of torque on the arm 42 being needed to lift the bags. When pin 54 contacts the arm at distance KA of 5.5 inch from the arm pivot, the force required is about 18.2 lb; when pins 50,52 contacts the arm at distance KB of 9.3 inch, only 8.1 lb force is required. However, the distance LA between the pin 54 and cam pivot is much less than the distance LB characterizing pins 50,52. Since the motor has 100 inch-lb of torque available, from the foregoing relations the torque in excess of that needed to first move the arm by the different pins is calculated and shown in FIG. 7. It is seen that substantially more force is available to accelerate the arm during the short stroke than during the long stroke.

Figure 8:
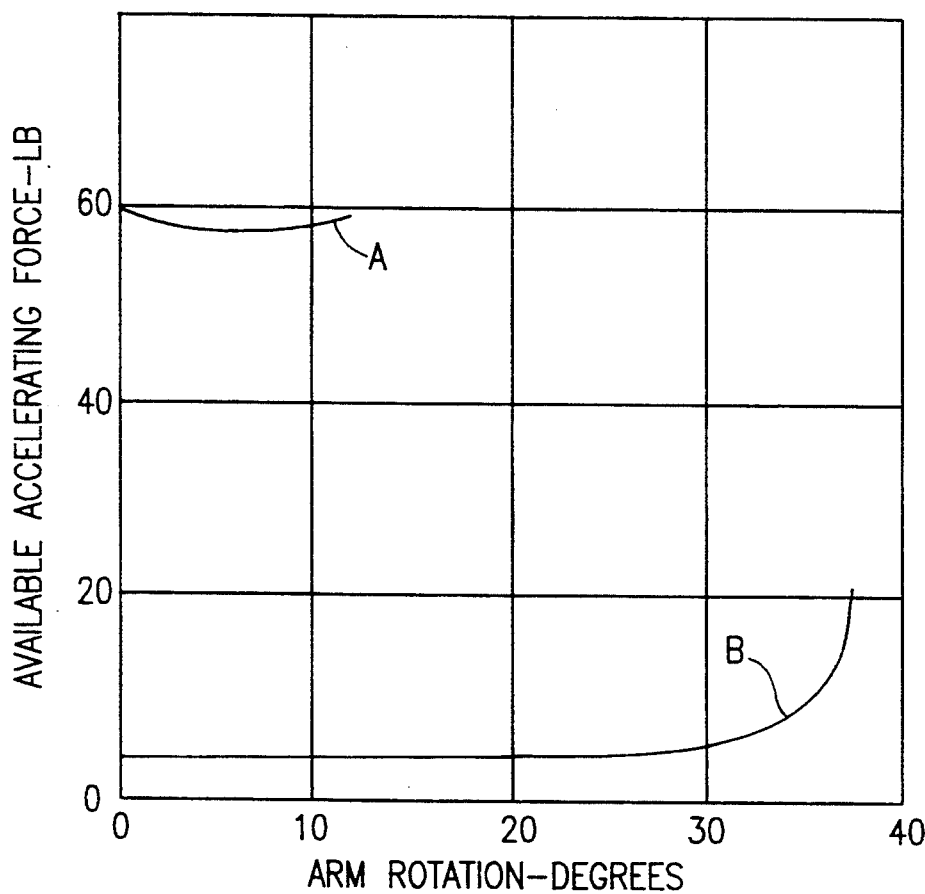
FIG. 8 shows how the force available for accelerating the shaker bar and bag varies according to which pin of the cam contacts the arm.
Figure 9:
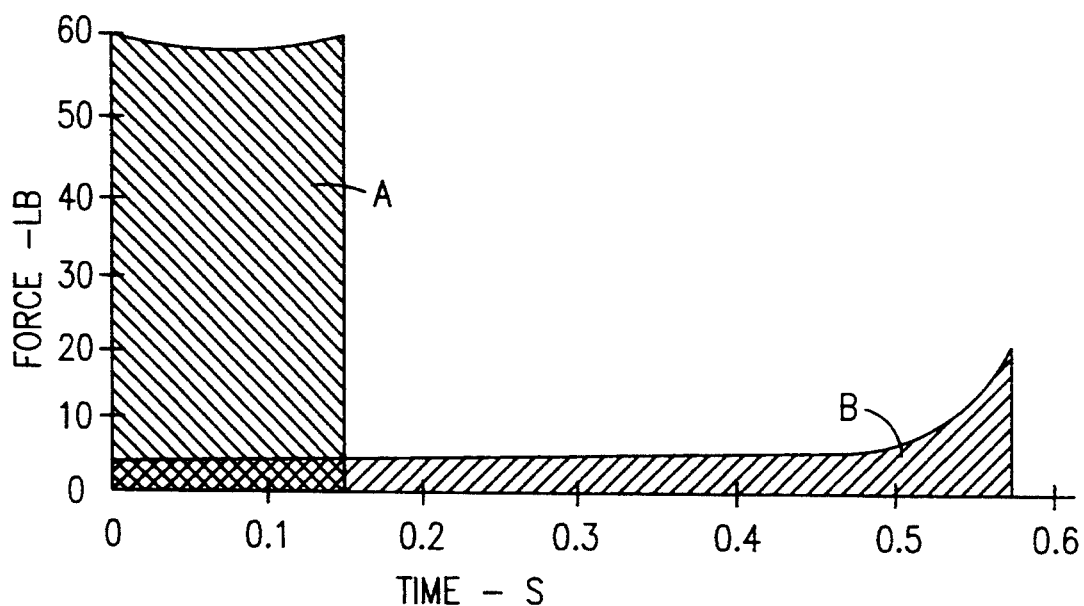
FIG. 9 is a plot of force as a function of time, showing how impulse, the shaded areas, varies according to which pin of the cam contacts the arm.

The data in FIG. 7 may be integrated with the times of lifting (Column E, Table 1), to show the variation of force with time. FIG. 8 shows such. The integral of force-time, or Impulse (change in momentum), is represented by the shaded areas under the force-time curves. The impluse represented by area A, characteristic of the pins 50,52 which engender the short stroke, is seen to be

TABLE 1

| COMPONENT MOTIONS USING VARYING SPEED MOTOR | | | | | | |
|---|---|---|---|---|---|---|
| ROTATION-DEGREES | | BAG LIFT "S"-INCH | MOTOR SHAFT REV/S. | TIME OF BAG LIFTING-S | ARM AVERAGE VELOCITY-O/S | AVG. BAG VEL.-INCH/S |
| CAM 40 | ARM 42 | | | | | |
| 68 | 38 | 3.8 | 0.33 | 0.57 | 67 | 6.7 |
| 39 | 0 | 0 | 1.1 | 0.10 | 0 | 0 |
| 56 | 12 | 1.3 | 1.0 | 0.15 | 0.59 | 8.7 |
| 49 | 0 | 0 | 1.1 | 0.12 | 0.0 | 0 |
| 56 | 12 | 1.3 | 1.0 | 0.15 | .50 | 8.7 |
| 92 | 0 | 0 | 1.1 | 0.23 | 1.0 | 0 |
| A | B | C | D | E | F | G |

The speeds of rotation for each part of the shaking cycle, given in Column D, are accordingly approximate.

Column E shows the calculated duration of each portion of the cycle, the cumulative time being nominally 1.33 seconds. Column F shows the rotary rate of shaker arm 42 (and thus striker bar 44) motion; Column G shows the rate at which the bag is lifted. It is seen that the 6.7 inch/s velocity of the long 3.8 inch lift is less than the 8.7 inch/s velocity of the short 1.3 inch lift. Of course, the velocity of dropping for the longer stroke will be greater than the velocity for the shorter stroke, owing to the greater distance and acceleration time under force of gravity.

Figure 6A:
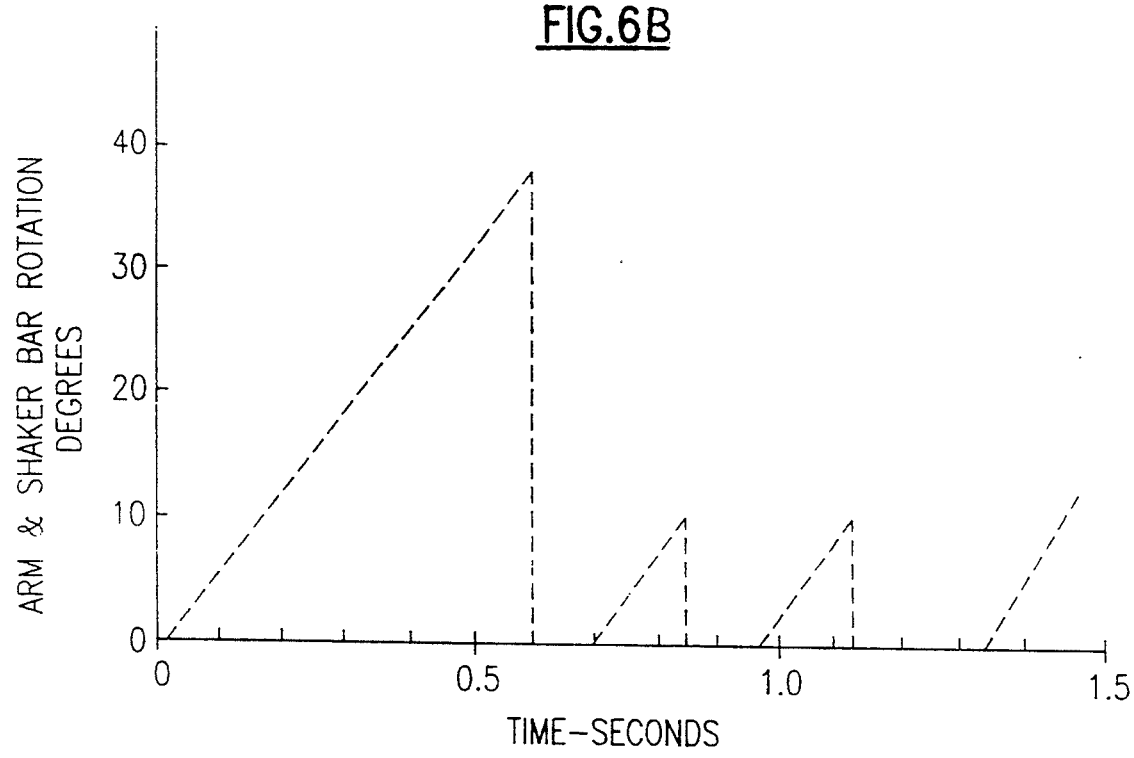

FIG. 6 graphically presents, in the lower portion—the angular motion of the arm/shaker bar, and in the upper portion—the corresponding vertical motion of bag. Because of the complexly varying speed of the motor as a function of load, dashed lines are used and their slopes are indicative of average velocity. As is evident the average velocity (8.7 inch/s) during the short stroke is about 30 percent greater than the velocity (6.7 inch/s) during the long stroke. Thus, the short stroke imparts greater velocity and thus greater momentum to the bag than does the long stroke.

FIG. 6 also makes graphic the dual-frequency nature of the preferred shaking cycle: long strokes occur at the rate of about 0.7 strokes/s, while the short strokes occur at a frequency of 3.7 strokes/s.

The character of the short stroke impact is substantially different than that of the long stroke, due to the apparatus configuration. FIG. 7 illustrates the mechanics of the cam-arm interaction and is understood from the following example. The distance M between the dramatically larger (about 2.5 times more) than the impulse represented by area B, characteristic of the pin 54 which engenders the long stroke. No exact quantitification has been made of the magnitude of difference in impulse which characterizes the preferred mode, although generally it ought to be substantial, and preferably the ratio is 2:1 or greater.

The pins impart impulse to the arm/shaker bar, and the shaker bar/striker imparts the impluse to the lower end of the bags. Thus, it will be appreciated that during the short stroke there is a quite high impulse, analogous to a hammering or rapping; and during the long stroke there is a less violent impact. In fact, such differences in impact are observed aurally and visually in actual dust collectors constructed in accord with the invention.

If only the short stroke was used, for certain dusts there will be a tendency for only the bottom end of the bag to be adequately freed of dust. On the other hand, if only long strokes are used, the fines removed by the short strokes will not be as effectively discharged, more power will be required for shaking, and there will be fewer dust-discharging strokes per unit time. Thus, the combination of long and short strokes provides effective cleaning in a cost-effective system.

The rotatable shaker bar described above is familiar in machines where shaking is manually activated. Thus the invention is readily adaptable to such. While it is an advantage to use a relatively low cost fractional horsepower motors, constant speed motors may be used. When a constant speed motor is used the above described velocity relationships will of course be altered. Also to carry out the bimodal method of the invention other means for lifting the bag bottoms, such as translating strikers, may be used. The diverse striker mechanisms may be powered by other than electric motors. For instance, linear electric actuators, or such as pneumatic or hydraulic systems may be used to accomplish the general invention method of two or more different amplitudes/impulses/velocities/frequencies of shaking. The invention is also applicable to other shape bags and to bags without stiffeners; for instance, bags may be lifted by internal cables.

While the dropping of the bag bottom end after lifting is preferably accomplished by using gravity, other lesser or greater imposed velocities of dropping may be used.

While a preferred embodiment involves the use of the two frequencies of shaking, i.e., two short lifts for every one long lift in each cycle, one long lift may alternate with one short lift within the practice of the invention. It is also within contemplation that other variations, e.g., more than two short strokes after each long stroke, may be used. However, based on experience with the cam arrangement described for the preferred embodiment, it would appear that one of the above mentioned alternate powering systems, or more complex cam designs should then be employed.

Although only the preferred embodiment has been described with some alternatives, it will be understood that further changes in form and detail may be made without departing from the spirit and scope of the claimed invention.

I claim:

1. A method of removing adhered particulate from a filter bag comprising the steps of:
   providing an apparatus which comprises a filter bag hanging vertically inside a dust collector, the filter bag having a fixed open upper end, a length, and a closed lower end;
   first, raising the filter bag closed lower end a first vertical distance, then dropping the closed lower end, to discharge a portion of particulate adhered thereto;
   second, raising the filter bag lower end a second vertical distance which is less than the first vertical distance, then dropping the lower end, to discharge additional particulate; and,
   third, repeating the first and second steps until a desired amount of adhered particulate is removed.

2. The method of claim 1 wherein the second vertical distance is less than half the first vertical distance.

3. The method of claim 1 wherein the first step substantially folds the filter bag along its length; and, wherein the second step insubstantially folds the bag along its length.

4. The method of claim 1 wherein the impulse (change in momentum) imparted to the filter bag by the second step is substantially higher than the impulse imparted to the filter bag by the first step.

5. The method of claim 4 wherein the second step imparts an impulse which is at least two times greater than the impulse imparted by the first step.

6. The method of claim 1 characterized by carrying out the second step at least twice before carrying out the third step.

7. The method of claim 1 wherein the average velocity of the first step raising of the filter bag lower end is less than the average velocity of the second step raising of the filter bag lower end.

8. In a dust collector having a cabinet enclosing a multiplicity of filter bags, the bags vertically suspended by open upper ends from a mounting surface inside the cabinet, the bags having closed lower ends, wherein particulate is collected on the exterior and along the lengths of the bags, the improvement which comprises means for discharging particulate from the exterior of the bags, the means configured to
   contact the closed lower ends of the multiplicity of filter bags with a first impulse, to vertically raise and drop the closed lower ends of the bags a first distance;
   then contact at least once the closed lower ends of the bags with a second impulse greater than the first impulse, to vertically raise and drop the closed lower ends of the bags a second distance which is less than the first distance; and
   repeating the first contacting and raising.

9. The dust collector of claim 8 characterized by filter bags having rigid closed lower ends, wherein the means for raising and dropping comprises a striker bar for contacting the closed lower ends.

10. The dust collector of claim 9 wherein the closed lower ends of the multiplicity of filter bags have oblong cross section shape, wherein the means comprises a shaker bar having an attached striker bar; the shaker bar rotatably mounted within the cabinet transverse to the lengths of the oblong shapes of the ends of the bags; said striker bar moving vertically upon rotation, to contact and raise the closed lower ends of the bags.

11. The dust collector of claim 8 wherein said means is configured for contacting and vertically raising and dropping the bag closed lower ends the second distance at least twice, prior to repeating the raising and dropping of the bag closed lower ends the first distance.

12. The dust collector of claim 8 characterized by a means for dropping which enables the lower ends of the bags to drop under the force of gravity.

13. A dust collector comprised of:
   a cabinet for enclosing a multiplicity of filter bags;
   a multiplicity of filter bags vertically suspended by open upper ends from a mounting surface inside the cabinet, the multiplicity of filter bags having lower ends which are closed, rigid, and oblong in cross section shape, wherein particulate adheres on the exteriors and along the lengths of the multiplicity of filter bags during dust collecting;
   a shaker bar, rotatably mounted inside the cabinet beneath the multiplicity of filter bags, the shaker bar having a portion moving vertically upon rotation to contact and vertically raise the lower ends of the multiplicity of filter bags, the shaker bar having a drive arm projecting transversely to the axis of shaker bar rotation;
   a cam, rotatably mounted, for engaging the shaker bar, to cause periodic rotation thereof, the cam comprised of a plate having two projecting pins, to engage the drive arm, comprising
      a first pin positioned a first length from the cam center of rotation;
      a second pin, spaced apart from the first pin and positioned a second length from the cam center of rotation, the second length being less than the first length;
      wherein the first pin causes the lower ends of the bags to be lifted a first distance, and the second pin causes the lower ends of the bags to be lifted a second distance; and,
   means for rotating the rotary cam.

14. The dust collector of claim 13 further comprised of a third pin on the plate, the third pin spaced apart from the first and second pin and positioned at a said second length from the cam center of rotation.

15. A dust collector comprised of:
a cabinet for enclosing a multiplicity of filter bags;
a multiplicity of filter bags vertically suspended by open upper ends from a mounting surface inside the cabinet, the multiplicity of filter bags having lower ends which are closed, rigid, and oblong in cross section shape, wherein particulate adheres on the exteriors and along the lengths of the multiplicity of filter bags during dust collecting;
a shaker bar, rotatably mounted inside the cabinet beneath the multiplicity of filter bags, the shaker bar having a portion moving vertically upon rotation to contact and vertically raise the lower ends of the multiplicity of filter bags;
a cam, rotatably mounted, for engaging the shaker bar, to cause periodic rotation thereof;
means for rotating the cam;
means for stopping rotation of the cam at a rotational position which leaves the multiplicity of filter bags in an unraised position.

16. The dust collector of claim 15 wherein the means for stopping rotation is comprised of a rotatable sub-cam, driven by said means for rotating the rotary cam; further comprising a sensor switch actuated by the sub-cam, the sensor switch controlling the means for rotating the rotary cam, to stop rotation of the cam when the bags are in an unraised position.

* * * * *